(12) United States Patent
Nakamura et al.

(10) Patent No.: US 7,633,052 B2
(45) Date of Patent: Dec. 15, 2009

(54) IMPACT DETECTION SYSTEM WITH THREE OR MORE OPTICAL FIBER SENSORS

(75) Inventors: Noritsugu Nakamura, Tokyo (JP); Toshimichi Ogisu, Tokyo (JP); Nobuo Takeda, Tokyo (JP)

(73) Assignees: Fuji Jukogyo Kabushiki Kaisha, Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 11/987,531

(22) Filed: Nov. 30, 2007

(65) Prior Publication Data

US 2008/0129982 A1 Jun. 5, 2008

(30) Foreign Application Priority Data

Dec. 1, 2006 (JP) ............................. 2006-326001

(51) Int. Cl.
*G01J 1/04* (2006.01)
*G01J 1/42* (2006.01)
*G01J 5/08* (2006.01)

(52) U.S. Cl. .................................. 250/227.14; 385/13

(58) Field of Classification Search ............ 250/227.14, 250/227.15, 227.16; 340/550, 555, 541; 385/13

See application file for complete search history.

(56) References Cited

U.S. PATENT DOCUMENTS

| | | | |
|---|---|---|---|
| 5,426,297 A | 6/1995 | Dunphy et al. | |
| 5,564,832 A | 10/1996 | Ball et al. | |
| 5,636,021 A * | 6/1997 | Udd | 356/483 |
| 5,898,502 A * | 4/1999 | Horiuchi et al. | 356/416 |
| 6,525,308 B1 | 2/2003 | Schmidt-Hattenberger | |
| 7,281,428 B2 * | 10/2007 | Kim | 73/643 |
| 2004/0149897 A1 * | 8/2004 | Tsai et al. | 250/227.14 |
| 2006/0013523 A1 * | 1/2006 | Childlers et al. | 385/12 |
| 2007/0103683 A1 * | 5/2007 | Wang | 356/364 |

FOREIGN PATENT DOCUMENTS

| | | |
|---|---|---|
| EP | 1 672 351 A2 | 6/2006 |
| JP | 2005-98921 | 4/2005 |
| WO | WO 99/24790 | 5/1999 |
| WO | WO 03/014657 A1 | 2/2003 |
| WO | WO 2006/123068 A1 | 11/2006 |

OTHER PUBLICATIONS

Extended European Search Report dated Apr. 28, 2009.

* cited by examiner

*Primary Examiner*—Thanh X Luu
*Assistant Examiner*—Francis M Legasse, Jr.
(74) *Attorney, Agent, or Firm*—McGinn IP Law Group, PLLC

(57) ABSTRACT

Disclosed an impact detection system including: three or more optical fiber sensors disposed respectively in different positions, the sensors not being in alignment with one another, in which the sensors each includes a core portion to have a grating portion formed therein, the grating portion has a plurality of gratings; light source; two or more optical filters having different pass bands to one another to an output light of one of the optical fiber sensors; and an arithmetic processing apparatus to perform arithmetic processing of output values of the three or more optical fiber sensors through the optical filters so as to specify a position on the subject where an impact is loaded, the output values being obtained when the impact is loaded on the subject.

13 Claims, 6 Drawing Sheets

INPUT WAVE

OUTPUT WAVE

IMPACT DETECTION SYSTEM WITH THREE OR MORE OPTICAL FIBER SENSORS

BACKGROUND OF THE INVENTION

1. Field of the Invention

The present invention relates to an impact detection system using an optical fiber sensor.

2. Description of Related Art

In a field in which both the strength and the weight saving of a material of, for example, the airframe of an airplane are required, it is indispensable to widely apply a composite material such as a carbon fiber reinforced plastic (CFRP) in order to meet the requirement of this kind.

As an apparatus for performing the detection of damage, a defect, and the like, of such a composite material, Japanese Patent Application Laid-Open Publication No. 2005-98921 describes a damage detecting apparatus using a fiber bragg grating (FBG) optical fiber sensor. The thinning of the diameter of an optical fiber has advanced recently (for example, to be a diameter of 52 [μm]), and, if the optical fibers are embedded in a structure, the lowering of the strength of the structure is scarcely produced. Consequently, the optical fiber has the advantage that the degree of freedom of the installation thereof is high.

The invention described in the Japanese Patent Application Laid-Open Publication No. 2005-98921 detects the damage of a composite material on the basis of a change of the output of characteristic detecting means by vibrating the composite material with a piezo-element. The invention uses the following components for the detection of the damage: the piezo-element fixed to be disposed at a predetermined position of a composite structure; a lead wire to transmit a signal to the piezo-element; the optical fiber sensor fixedly disposed so that the composite material constituting the composite structure is put between the optical fiber sensor and the piezo-element, which sensor has a grating portion reflecting light of a predetermined wavelength on a core portion; a light source performing the radiation of light to a core portion; and the characteristic detecting means for detecting the characteristics of the reflected light from the grating portion. Moreover, a spectrum analyzer or the like to detect the frequency characteristic of the reflected light from the grating portion is used as the characteristic detecting means.

However, the invention described in the Japanese Patent Application Laid-Open Publication No. 2005-98921 cannot specify the existence, the position, and the magnitude of an arbitrary impact having an arbitrary magnitude when an object structure receives the impact at an arbitrary position on the structure.

SUMMARY OF THE INVENTION

It is, therefore, a main object of the present invention to configure an impact detection system using an optical fiber sensor.

According to a first aspect of the invention, in order to attain the above object, an impact detection system includes: three or more optical fiber sensors disposed respectively in different positions of a subject to be inspected, the sensors not being in alignment with one another, in which the optical fiber sensors each includes a core portion to have a grating portion formed therein, the grating portion has a plurality of gratings reflecting light so that a wavelength band of reflected light changes when a distance between adjacent gratings changes, and the optical fiber sensor vibrates the wavelength band depending on an elastic wave propagating through the subject; a light source to input light into the core portion, in which a spectrum bandwidth of the light includes at least a desired vibration width of the wavelength band; two or more optical filters connected to an output end of the optical fiber sensor, the optical filters having different pass bands to one another with respect to an output light of one of the optical fiber sensors; and an arithmetic processing apparatus to perform arithmetic processing of output values of the three or more optical fiber sensors through the optical filters so as to specify a position on the subject where an impact is loaded, the output values being obtained when the impact is loaded on the subject.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

In the following, one embodiment of the present invention is described with reference to the attached drawings. The following is one embodiment of the present invention and does not limit the present invention.

Figure 1:
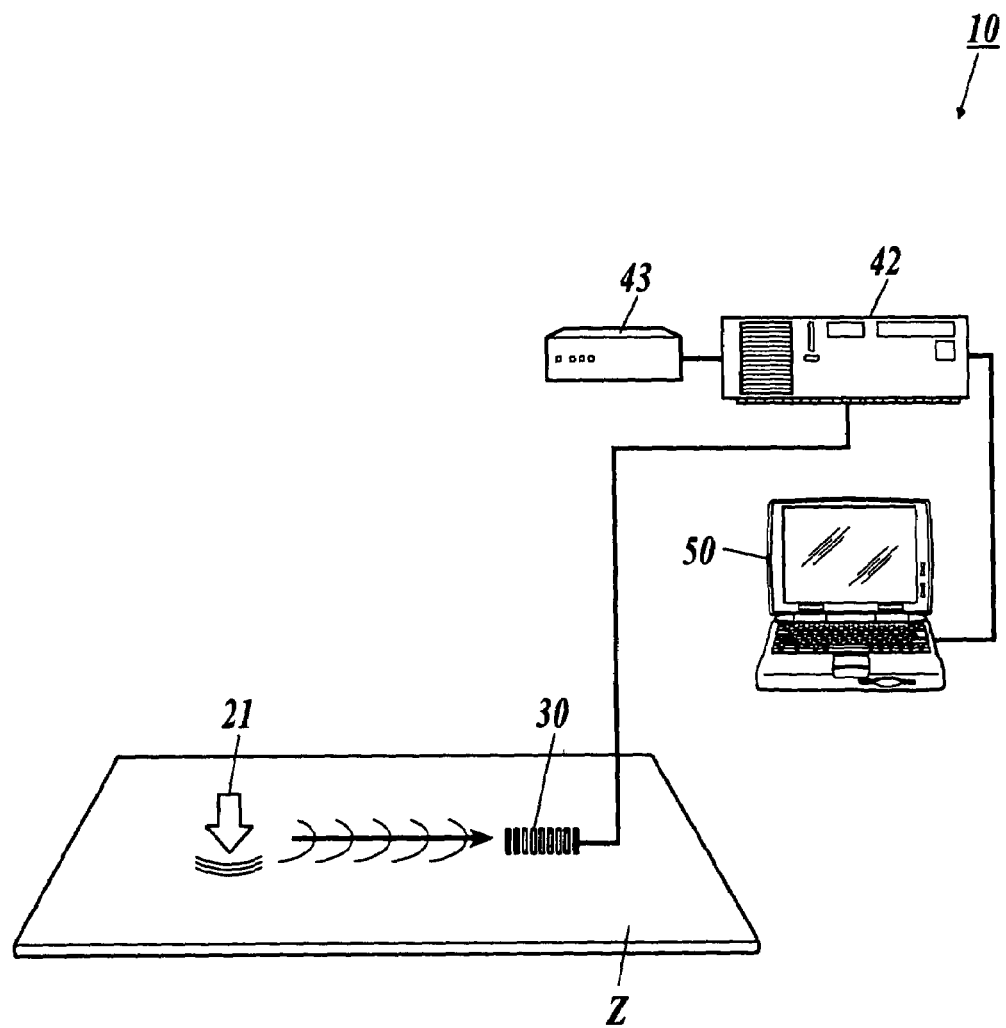
FIG. 1 is a schematic configuration diagram of an impact detection system according to an embodiment of the present invention.

FIG. 1 is a schematic configuration diagram of an impact detection system 10 to perform the detection of an impact to a composite structure Z. In the present embodiment, the composite structure Z is used as a subject to be inspected.

As shown in FIG. 1, the impact detection system 10 of the present embodiment is equipped with optical fiber sensors 30 installed at predetermined positions of the composite structure Z, in which the detection of an impact 21 is to be performed, by being embedded or stuck; a spectrum analyzer 42 to detect the wavelength characteristics of reflected lights obtained from the optical fiber sensors 30; and an arithmetic processing apparatus 50 to performing the arithmetic processing of an output value of the spectrum analyzer 42. Moreover, a power supply device 43 of the spectrum analyzer 42 is shown. The three or more, or the four or more, optical fiber sensors 30 are disposed at different positions being not on a straight line, although they are not shown.

Figure 2A:
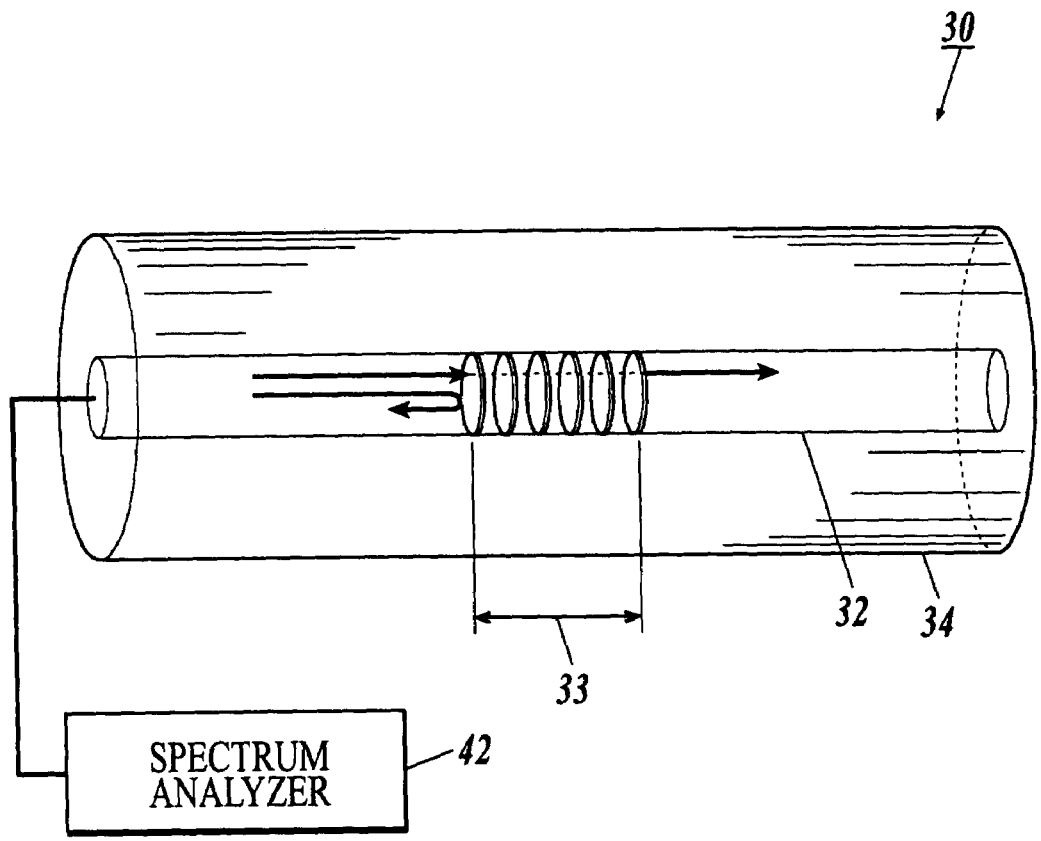
FIG. 2A is a schematic configuration diagram of an optical fiber sensor.

Each of the optical fiber sensors 30 is a fiber bragg grating (FBG) optical fiber sensor. As shown in the schematic configuration diagram of FIG. 2A, each of the optical fiber sensors 30 includes a grating portion 33 reflecting light having a predetermined wavelength in the core portion 32 of the optical fiber sensor 30 to be formed as an optical fiber 34.

The optical fiber 34 is connected to the spectrum analyzer 42 at one end of the optical fiber 34, and irradiating lights covering the whole wavelength band of a predetermined range are entered into the core portion 32 by the light source provided in the spectrum analyzer 42. The lights entering from the spectrum analyzer 42 propagate through the core portion 32, and lights having only a part of wavelengths of the entering lights are reflected at the grating portion 33.

Figure 2B:
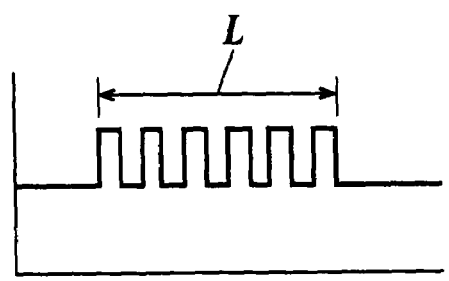
FIG. 2B is a diagram showing the changes of the refraction index of a grating portion in the traveling direction of light.

FIG. 2B is a diagram showing the changes of a refraction index of the core portion 32 in the traveling direction of light, and a range L in the figure shows the refraction index in the grating portion 33.

As shown in the figure, the grating portion 33 is formed so as to change the refraction index of the core portion 32 at a fixed period. The grating portion 33 selectively reflects only the light having a specific wavelength at the boundary parts where the refraction index changes. If a disturbance, such as a strain caused by a vibration, is applied to the grating portion 33, then the grating intervals thereof change (expansion or contraction), and the wavelength of the reflected light thereby changes.

The wavelength change $\Delta\lambda_B$ of a reflected light of an FBG optical fiber sensor can here be expressed by the following formula, where n denotes the effective refractive index of the core, $\Lambda$ denotes a grating interval, $P_{11}$ and $P_{12}$ denote Pockels coefficients, $\nu$ denotes a Poisson ratio, $\epsilon$ denotes applied strain, $\alpha$ denotes the temperature coefficient of the fiber material, and $\Delta T$ denotes a temperature change (see Alan D. Kersey, "Fiber Grating Sensors," JOURNAL OF LIGHTWAVE TECHNOLOGY, Vol. 15, No. 8, 1997).

$$\Delta\lambda_B = \quad \text{[Formula 1]}$$

$$2n\Lambda\left(\left\{1 - \left(\frac{n^2}{2}\right)[P_{12} - \nu(P_{11} + P_{12})]\right\}\epsilon + \left[\alpha + \frac{\left(\frac{dn}{dT}\right)}{n}\right]\Delta T\right)$$

Consequently, when a vibration propagates to the grating portion 33, the strain amount $\epsilon$ of the grating portion 33 changes, and the wavelength of a reflected light changes according to the strain amount $\epsilon$ as a result. If a vibration is transmitted from the vibration source in a good condition, then the grating portion 33 is greatly distorted, and the change $\Delta\lambda_B$ of the wavelength greatly changes. Moreover, if a vibration is not transmitted from the vibration source in a good condition, the grating portion 33 is small distorted, and the change $\Delta\lambda_B$ of the wavelength small changes.

Figure 3A:
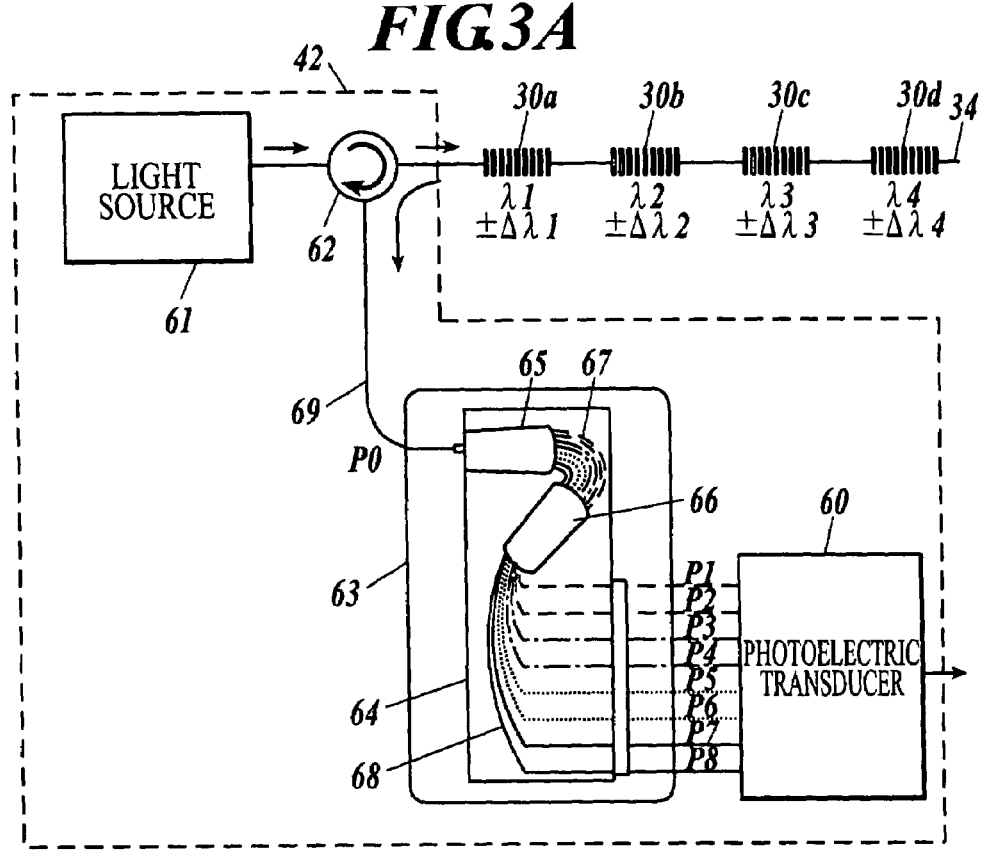
FIG. 3A is a configuration diagram showing the optical fiber sensor and a spectrum analyzer connected to the sensor.

FIG. 3A shows a configuration example of an optical fiber sensor and the spectrum analyzer 42 connected to it. As shown in FIG. 3A, the spectrum analyzer 42 includes a light source 61, an optical circulator 62, an arrayed waveguide grating (AWG) module 63, and a photoelectric transducer 60. In the present configuration example, the optical fiber 34 that is composed of four optical fiber sensors 30a-30d that have different reflection wavelengths from one another and are connected in series is connected to the spectrum analyzer 42. AS the minimum configuration, three optical fiber sensors 30 are required. The optical fiber sensors 30 formed in series as one optical fiber may be used as the present configuration example, or three or more optical fiber sensors formed as an independent plural optical fibers may be used.

The light source 61 is a wide band light source including a desired vibration band of reflection wavelengths of the optical fiber sensors 30a-30d. When the reflection wavelength characteristic of an optical fiber sensor changes to the outside of the wavelength band of the light source, no reflected lights are produced. Consequently, the wavelength band of the light source limits the detection range of vibrations. It is preferable to set the light source to have a sufficiently wide band in order that a perfect reflected light is always emitted even if the reflection wavelengths of the optical fiber sensors 30a-30d vibrate by an impact. The vibration band of the reflection wavelengths of an optical fiber sensor depends on the characteristics of the optical fiber sensor, an impact, the quality of the material of a subject to be inspected.

The optical circulator 62 causes light from the light source 61 to travel to the side of the optical fiber sensors 30a-30d, and guides the reflected lights from the optical fiber sensors 30a-30d to the input port P0 of the AWG module 63. The reflected light guided by the optical circulator 62 is introduced into the input port P0 of the AWG module 63 by an optical fiber 69.

The AWG module 63 includes an AWG board 64. A lightwave circuit monolithically integrated on a glass substrate by the technique of the optical waveguide is formed on the AWG board 64. The lightwave circuit on the AWG board 64 includes input and output slab waveguides 65 and 66, an arrayed waveguide 67, and an output waveguide 68, and constitutes eight optical filters that are connected to the input port P0 in parallel with one another and have different pass bands from one another. The lightwave circuit on the AWG board 64 separates the multiplexed-wavelength input light, into the lights having respective wavelengths, by distributing the input light to pass it through the eight optical filters, and outputs the lights in parallel with one another to eight output ports P1-P8. Here, the number of the output ports in practical use is not limited to eight.

Figure 3B:
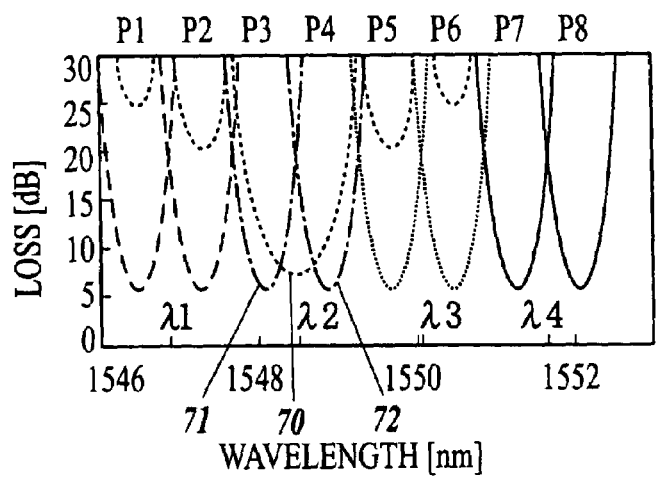
FIG. 3B is a spectrum diagram showing the pass bands of eight optical filters.

The pass bands of the respective optical filters corresponding to the eight output ports P1-P8 are shown in the spectrum diagram of FIG. 3B. For example, an optical filter passes the reflected light corresponding to the part in FIG. 3B in which the reflected light input distribution 70 of the reflected light from the optical fiber sensor 30b having a center wavelength $\lambda 2$ overlaps with a pass band 71 of the optical filter, and outputs the passed reflected light to the output port P3. Furthermore, in parallel with the aforesaid reflected light, another optical filter passes the reflected light corresponding to the part in which the reflected light overlaps with a pass band 72, and outputs the passed reflected light to the output port P4. The optical filter made to correspond to the one optical fiber sensor 30b may be set as two optical filters corresponding to the output ports P3 and P4, or may be set as, for example, the three output ports P3-P5 or the five output ports P2-P6. The number and the distribution of the optical fibers made to correspond to one optical fiber sensor are set in view of the fact that the vibration band of the reflection wavelength of an optical fiber sensor depends on an unknown impact.

As a typical example, the processing using two optical filters to the reflected light from one optical fiber sensor 30 is described with reference to FIGS. 4A-4C.

Figure 4A:
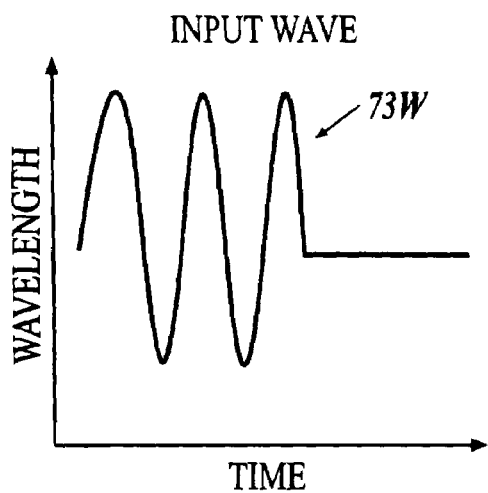
FIG. 4A is a diagram showing the waveform of an input wave into the optical filter.
Figure 4C:
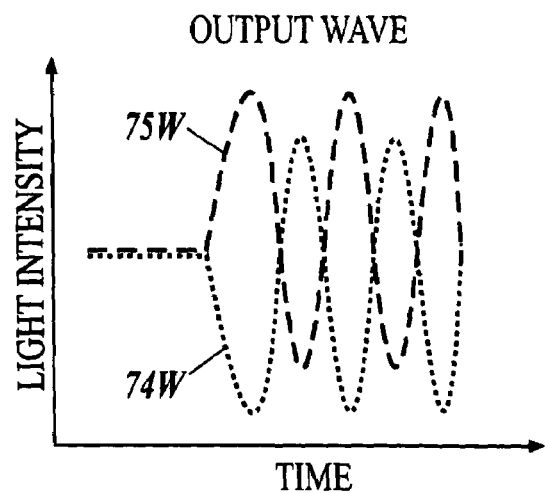
FIG. 4C is a diagram showing the waveforms of output waves of the optical filters.
Figure 4B:
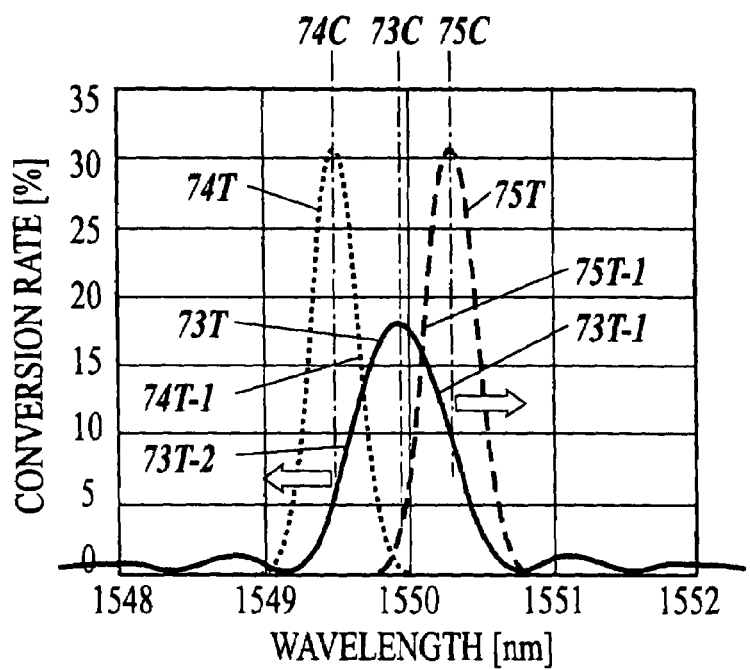
FIG. 4B is a spectrum diagram showing the pass band of two optical filters.

As shown in FIG. 4B, an input distribution 73T of the reflected light from the optical fiber sensor 30 appears. At the time of loading an impact, an elastic wave from an impact position as a vibration source propagates through the composite structure Z, and the optical fiber sensor 30 vibrates the wavelength of the reflected light output according to the elastic wave propagating through the composite structure Z. The vibration of the wavelength is shown as an input wave 73W of FIG. 4A.

According to the vibration of the wavelength, the reflected light input distribution 73T shown in FIG. 4B shifts to a higher level and a lower level alternately to minutely vibrate and the value of the wavelength repeats increase and decrease.

In such a wavelength vibration, 73C in the figure denotes the vibration center of the center wavelength of the reflected light input distribution 73T. The center wavelength 75C of the pass band 75T of one optical filter is fixed in a higher area relative to the vibration center 73C. The center wavelength 74C of the pass band 74T of the other optical filter is fixed in a lower area relative to the vibration center 73C.

Furthermore, in a static state of a standstill of the reflected light input distribution 73T, the lower side slope 75T-1 of the higher pass band 75T intersect with the higher side slope 73T-1 of the reflected light input distribution 73T.

Similarly, in a static state of the reflected light input distribution 73T, the higher side slope 74T-1 of the lower pass band 74T intersects with the lower side slope 74T-2 of the reflected light input distribution 73T.

The wavelength vibrations of a reflected light can be detected at a high sensitivity by fixing the pass bands 75T and 74T in the aforesaid positional relation to the reflected light input distribution 73T.

The higher optical filter passes the reflected light corresponding to the part in which the reflected light input distribution 73T overlaps with the pass band 75T, and outputs the passed reflected light. Similarly, the lower optical filter passes the reflection light corresponding to the part in which the reflected light input distribution 73T overlaps with the pass band 74T, and output the passed reflected light.

Consequently, when the value of the wavelength of the reflected light increases and the reflected light input distribution 73T shifts to the higher level, the output value of the higher optical filter having the pass band 75T increases, and the output value of the lower optical filter having the pass band 74T decreases. Adversely, when the value of the wavelength of the reflected light decreases and the reflected light input distribution 73T shifts to the lower level, the output value of the higher optical filter having the pass band 75T decreases, and the output value of the lower optical filter having the pass band 74T increases.

Consequently, when the change of the center wavelength of a reflected light vibrates by the input wave 73W shown in FIG. 4A, the output value of the higher optical filter having the pass band 75T generates an output wave 75W shown in FIG. 4C, and the output value of the lower optical filter having the pass band 74T generates an output wave 74W shown in FIG. 4C. As shown in FIG. 4C, the output waves 74W and 75W become the waves having the phase in an inverse relation to each other. Incidentally, the input wave 73W depends on an impact. In order to deal with an unknown impact, the method of disposing two or more optical filters having different pass bands on each of the higher side and the lower side may be adopted. The plurality of optical filters having the configuration mentioned above is made to correspond to each of the necessary three or more optical fiber sensors. The necessary number of the channels of the AWG module 63 and the necessary number of the AWG modules 63 are provided.

The spectrum analyzer 42 shown in FIG. 3A outputs light waves to the output ports P1-P8 on the basis of the principle mentioned above, and the photoelectric transducer 60 converts the light waves into electric signals to output them to the outside. The outputs of the spectrum analyzer 42 receive the A/D conversion through a not shown interface, and are input into the arithmetic processing apparatus 50.

The arithmetic processing apparatus 50 performs the arithmetic processing for calculating the position and the magnitude of an impact by the following method 1, method 2, or the other methods on the basis of the output values of the spectrum analyzer 42. Moreover, the arithmetic processing apparatus 50 performs the recording of the operation results.

The arithmetic processing apparatus 50 of the present embodiment is composed of an electronic computer. The arithmetic processing apparatus 50 is composed of, for example, a central processing unit (CPU) performing arithmetic processing in conformity with a program; a read only memory (ROM) storing the program; a random access memory (RAM) storing input value data from the spectrum analyzer 42, and the data in the operation processes in conformity with the program and the data of operation results; an interface performing the transmission and the reception of data with spectrum analyzer 42; an image output interface converting the display data of the operation results into an image signal of a suitable format to output the converted image signal to a display monitor; and a data bus performing the transmission of various instructions and data among the respective components mentioned above.

[Method 1]

Figure 5:
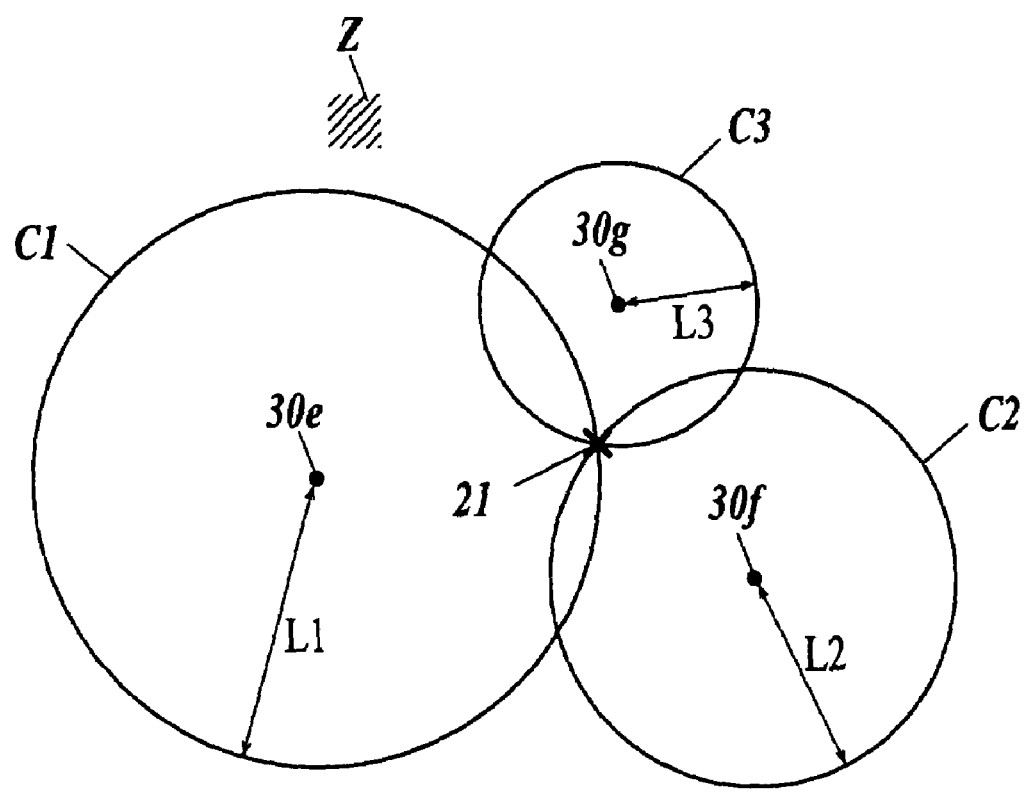
FIG. 5 is a plan view for illustrating one method for identifying an impact position according to one embodiment of the present invention.

The method of using three optical fiber sensors is first described as one method with reference to FIG. 5. As shown in FIG. 5, optical fiber sensors 30e, 30f, and 30g are installed in a structuring composite material Z at three different points not on a straight line.

A vibration generated by an impact propagates through the structure as a wave. The wave propagating at this time is composed of an $S_0$ wave (P wave) arriving at the optical fiber sensors 30 precedently and an $A_0$ wave (S wave) arriving at the optical sensors 30 lately. Because the two waves have different propagation speeds, a difference is produced between their arrival times. Because high accuracy detection is enabled by using the optical fiber sensors 30, each of the waves can individually be identified even if the difference between the arrival times is little. The propagation distances of the waves, that is, the distances between the impact 21 and each sensor, can be calculated on the basis of the obtained difference between the arrival times and the known propagation speed difference.

The arithmetic processing apparatus 50 calculates propagation distances L1, L2, and L3 from the unknown impact 21 to each of the optical fiber sensors 30e, 30f, and 30g on the basis of the input data from the spectrum analyzer 42 by the principle described above. That is, the arithmetic processing apparatus 50 performs the analysis processing with the data of the elastic waves obtained by the detection with each of the optical fiber sensors 30e, 30f, and 30g to calculate the difference between the arrival times of the $S_0$ wave and the $A_0$ wave, and multiplies the difference by the known propagation speed difference to calculate the propagation distances L1, L2, and L3 from the impact 21 to each of the optical fiber sensors 30e, 30f, and 30g.

Furthermore, the arithmetic processing apparatus 50 performs the operations of identifying the intersection point of three circles C1, C2, and C3 having radii of propagation distances L1, L2, and L3, respectively, from the centers of the optical fiber sensors 30e, 30f, and 30g, respectively, as the position of the impact 21.

At this time, the detection values of four or more optical fiber sensors 30 may be used in order to enhance the precision and the like.

Moreover, the arithmetic processing apparatus 50 calculates the vibration energy of the elastic wave detected by the optical fiber sensor 30g on the basis of the input value data from the spectrum analyzer 42. Furthermore, the arithmetic processing apparatus 50 calculates the magnitude of the impact on the basis of the propagation distance L3 nearest to the impact and the magnitude of the vibration energy of the elastic wave detected by the optical fiber sensor 30g corresponding to the distance L3. The detection values of two or more optical fiber sensors 30 may be used for the calculation of the magnitude of the impact.

[Method 2]

Figure 6:
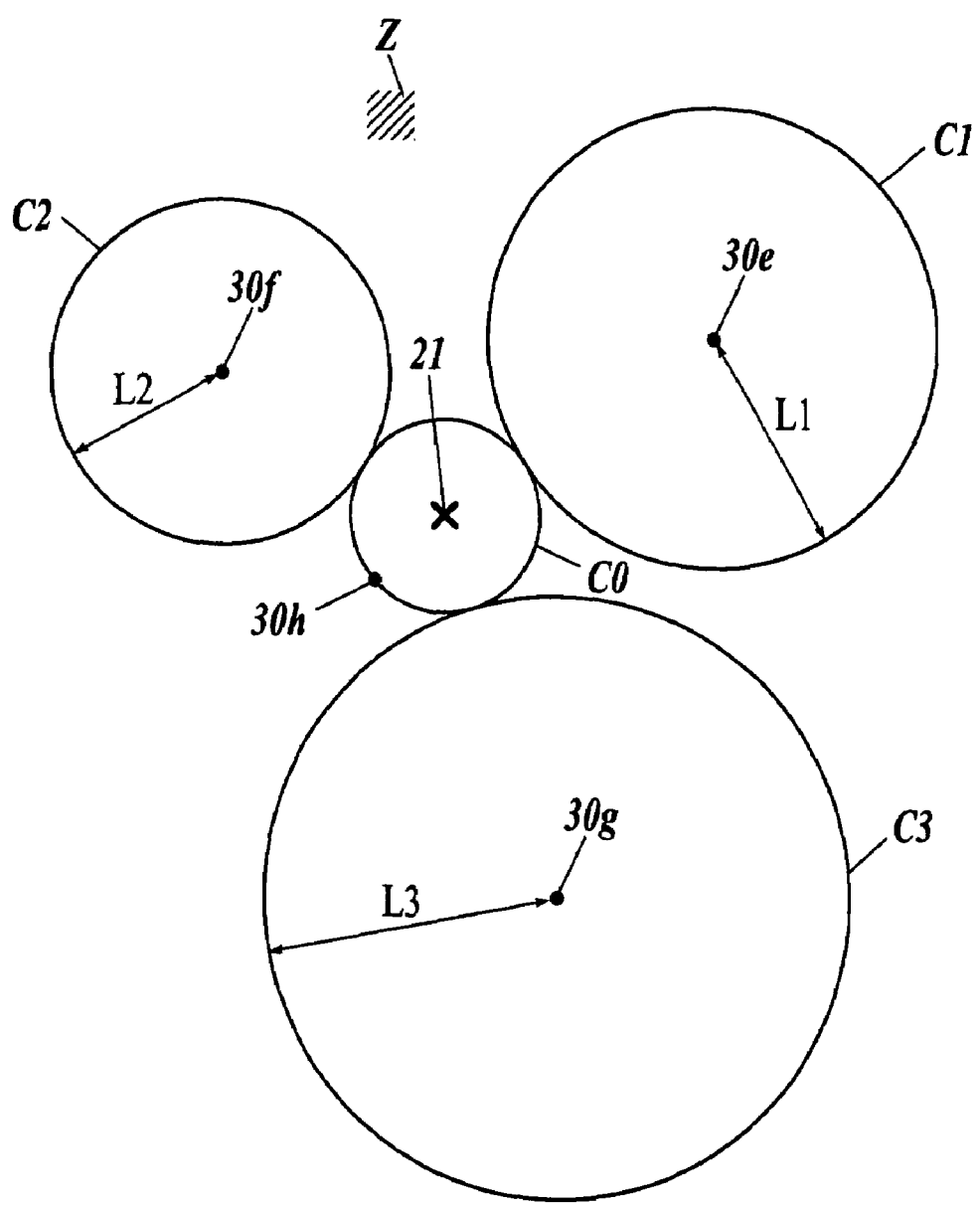
FIG. 6 is a plan view for illustrating another method for identifying the impact position according to the one embodiment of the present invention.

Next, the method of using four optical fiber sensors is described as another method with reference to FIG. 6. As shown in FIG. 6, the optical fiber sensors 30e, 30f, 30g, and 30h are installed in the structuring composite material Z at different four points.

The arithmetic processing apparatus 50 measures the arrival time of the elastic wave (for example, $S_0$ wave) having the same propagation speed from the vibration source of the impact 21 as for each of the four optical fiber sensors 30e, 30f, 30g, and 30h. That is, the arithmetic processing apparatus 50 performs the analysis processing with the data of the elastic wave obtained by the detection by each of the optical fiber sensors 30e, 30f, 30g, and 30h to calculates the arrival time of the elastic wave (for example, $S_0$ wave). The arithmetic processing apparatus 50 calculates the difference of each arrival time between the optical fiber sensor 30h, at which the elastic wave has arrived at the earliest time, and each of the other three optical fiber sensors 30e, 30f, and 30g. Furthermore, the arithmetic processing apparatus 50 multiplies the obtained arrival time difference by the known propagation speed to calculate the object propagation distances L1, L2, and L3 of the elastic wave. Furthermore, the arithmetic processing apparatus 50 performs the operation for identifying the center of the common circumcircle C0 of the three circles C1, C2, and C3 having the centers of the optical fiber sensors 30e, 30f, and 30g, respectively, and the radii of the propagation distances L1, L2, and L3, respectively, as the position of the impact 21.

Moreover, the arithmetic processing apparatus 50 calculates the vibration energy of the elastic wave detected with the optical fiber sensor 30h on the basis of the input value data from the spectrum analyzer 42. Furthermore, the arithmetic processing apparatus 50 calculates the magnitude of the impact on the basis of the magnitude of the vibration energy detected with the nearest optical fiber sensor 30h and the radius of the circle C0 obtained by the above impact position identifying operation.

Incidentally, the detection values of more optical fiber sensors 30 may be used in order to heighten the precision and the like.

According to the embodiment of the present invention, the position, or the position and the magnitude, of an impact loaded on a subject to be inspected can be detected by the use of the optical fiber sensors.

Moreover, because the optical fiber sensors are used, the sensors can easily be installed in a subject to be inspected of the airframe of an airplane or the like by being embedded or by being pasted, and the existence of an impact can immediately be judged independently of the state of the subject such as moving or stopping. If an impact is loaded, the position, or the position and the magnitude, of the impact can be detected, and they can be informed to an operator or another system to be utilized for safe operating. The operator and the other system can expect damage or destruction and can measure the necessity of the search and the inspection of them by knowing the position, or the position and the magnitude, of the impact. Moreover, the history of impact loading can be utilized for the life expectation of the subject and the accident analysis thereof, which can be utilized for the safe operation.

Moreover, because two or more optical fibers having different pass bands are made to correspond to one optical fiber sensor, the information of an elastic wave can correctly be obtained, and the accuracy of specifying the existence, the position, and the magnitude of an impact can be enhanced.

The entire disclosure of Japanese Patent Application No. 2006-326001 filed on Dec. 1, 2006, including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An impact detection system, comprising:
three or more optical fiber sensors disposed respectively in different positions of a subject to be inspected, the sensors not being in alignment with one another, in which the optical fiber sensors each includes a core portion having a grating portion formed therein, the grating portion having a plurality of gratings reflecting light so that a wavelength band of reflected light changes when a distance between adjacent gratings changes, and the three or more optical fiber sensors vibrates the wavelength band depending on an elastic wave propagating through the subject;
a light source to input light into the core portion, in which a spectrum bandwidth of the light includes at least a desired vibration width of the wavelength band;
two or more optical filters connected to an output end of the three or more optical fiber sensors, the optical filters having different pass bands to one another with respect to an output light of one of the optical fiber sensors; and
an arithmetic processing apparatus to perform arithmetic processing of output values of the three or more optical fiber sensors through the optical filters so as to specify a position on the subject where an impact is loaded, the output values being obtained when the impact is loaded on the subject,
wherein the arithmetic processing apparatus measures a difference of arrival times between two elastic waves having different propagation speeds, the two elastic waves caused by the impact as a vibration source, at each of the three or more optical fiber sensors, so as to specify the position where the impact is loaded on the subject on a basis of a measurement result.

2. The impact detection system according to claim 1, wherein the arithmetic processing apparatus performs the arithmetic processing of the output values of the optical fiber sensors through the optical filters so as to specify a magnitude of the impact loaded on the subject, the output values being obtained when the impact is loaded on the subject.

3. The impact detection system according to claim 1, wherein the three or more optical fiber sensors comprise four or more optical fiber sensors,
wherein the arithmetic processing apparatus measures an arriving time of the a single elastic wave caused by the impact as a vibration source, at each of the said optical fiber sensors, so as to specify the position where the impact is loaded on the subject on a basis of a measurement result.

4. The impact detection system according to claim 1, wherein the optical filters comprise arrayed waveguide grating type optical filters.

5. The impact detection system according to claim 1, wherein the three or more optical fiber sensors comprise more than one optical fiber.

6. The impact detection system according to claim 1, wherein at least one of the three or more optical fiber sensors is embedded in the subject.

7. The impact detection system according to claim 1, wherein at least one of the three or more optical fiber sensors is attached onto the subject.

8. The impact detection system according to claim 1, wherein one of the two elastic waves having different propagation speeds comprises an S-wave, and one of the two elastic waves having different propagation speeds comprises a P-wave.

9. An impact detection system, comprising:
three or more optical fiber sensors disposed respectively in different positions of a subject to be inspected, the sensors not being in alignment with one another, in which the optical fiber sensors each includes a core portion having a grating portion formed therein, the grating portion having a plurality of gratings reflecting light so that a wavelength band of reflected light changes when a distance between adjacent gratings changes, and the three or more optical fiber sensors vibrates the wavelength band depending on an elastic wave propagating through the subject;
a light source to input light into the core portion, in which a spectrum bandwidth of the light includes at least a desired vibration width of the wavelength band;
two or more optical filters connected to an output end of the three or more optical fiber sensors, the optical filters having different pass bands to one another with respect to an output light of one of the optical fiber sensors; and
an arithmetic processing apparatus to perform arithmetic processing of output values of the three or more optical fiber sensors through the optical filters so as to specify a position on the subject where an impact is loaded, the output values being obtained when the impact is loaded on the subject,
wherein the arithmetic processing apparatus measures a difference of arrival times between two elastic waves having different propagation speeds. the two elastic waves caused by the impact as a vibration source, at each of the three or more optical fiber sensors, so as to specify the position where the impact is loaded on the subject on a basis of a measurement result, and
wherein the arithmetic processing apparatus calculates a distance between a position on the subject where an impact is loaded and each of a plurality of optical fiber sensors based on a difference between arrival times of the two elastic waves having different propagation speeds and a known propagation speed difference.

10. The impact detection system according to claim 9, wherein the arithmetic processing apparatus calculates the position on the subject where an impact is loaded by calculating a point which corresponds to an intersection of a plurality of circles, wherein each of three or more optical fiber sensors comprise a center of a circle and a corresponding distance between a position on the subject where an impact is loaded and each of the three or more optical fiber sensors comprise a radius of a circle.

11. The impact detection system according to claim 10, wherein the arithmetic processing apparatus calculates a magnitude of the impact based on a vibration energy detected at a closest of said three or more optical fiber sensors to the impact and a distance between the position on the subject where an impact is loaded and a closest of a plurality of optical fiber sensors.

12. An impact detection system, comprising:
three or more optical fiber sensors disposed respectively in different positions of a subject to be inspected. the sensors not beans in alignment with one another, in which the optical fiber sensors each includes a core portion having a grating portion formed therein, the grating portion having a plurality of gratings reflecting light so that a wavelength band of reflected light changes when a distance between adjacent gratings changes, and the three or more optical fiber sensors vibrates the wavelength band depending on an elastic wave propagating through the subject;
a light source to input light into the core portion, in which a spectrum bandwidth of the light includes at least a desired vibration width of the wavelength band;
two or more optical filters connected to an output end of the three or more optical fiber sensors, the optical filters having different pass bands to one another with respect to an output light of one of the optical fiber sensors; and
an arithmetic processing apparatus to perform arithmetic processing of output values of the three or more optical fiber sensors through the optical filters so as to specify a position on the subject where an impact is loaded, the output values being obtained when the impact is loaded on the subject,
wherein the three or more optical fiber sensors comprise four or more optical fiber sensors,
wherein the arithmetic processing apparatus measures an arriving time of the a single elastic wave caused by the impact as a vibration source, at each of the said optical fiber sensors, so as to specify the position where the impact is loaded on the subject on a basis of a measurement result,
wherein the arithmetic processing apparatus calculates a difference of a plurality of arrival times of a single elastic wave caused by the impact as a vibration source, the plurality of arrival times being calculated based on a time difference between the single elastic waves time of arrival at a first of a plurality of optical fiber sensors and the time of arrival at a plurality of other of a plurality of optical fiber sensors,
wherein the arithmetic processing apparatus calculates the location of the impact represented by a center of a common circumcircle, and
wherein the circumcircle is determined by creating a plurality of circles with centers located at a plurality of the other of a plurality of fiber sensors, and radii determined by a propagation distance based on the time of a arrival of the single elastic wave caused by the impact as a vibration source at the first of said optical fiber sensors and the time of arrival of the single elastic wave caused by the impact as a vibration source at each of the other of said optical fiber sensors and a known propagation speed.

13. The impact detection system according to claim 12, wherein the arithmetic processing apparatus calculates a magnitude of the impact based on a vibration energy detected at a first of said three or more optical fiber sensors to the impact and a radius of the calculated circumcircle.

* * * * *